Aug. 20, 1946.   R. E. NELSON   2,406,157
RIVET
Filed July 12, 1943

Inventor
Richard E. Nelson
By
Attorney

Patented Aug. 20, 1946

2,406,157

UNITED STATES PATENT OFFICE 2,406,157

RIVET

Richard E. Nelson, Spokane, Wash., assignor to Universal Development Company, Spokane, Wash.

Application July 12, 1943, Serial No. 494,393

3 Claims. (Cl. 85—40)

This invention relates to rivets and more particularly to a rivet known as a blind rivet and adapted to be passed through plates to be secured to each other and clinched from its outer end. It will thus be seen that the rivet may be used for securing plates of airplane wings and other plates in such position that access to the inner ends of the rivets cannot be had.

Another object of the invention is to provide a rivet including a sleeve and a screw or threaded core of such formation that by turning the core from its outer end, the inner end of the sleeve may be headed and plates through which the rivet passes firmly clamped against each other.

Another object of the invention is to so form the sleeve that it may be held stationary while the screw or core is turned to form a head at the inner end of the sleeve.

Another object is to so form the inner end of the sleeve that it may be expanded and formed into a head without likelihood of it splitting.

Another object of the invention is to so form the inner end of the screw that it will be provided with a spreading head having a tapered neck adapted to facilitate movement of the head into the rear or inner end portion of the sleeve.

Another object of the invention is to so form the bolt and outer end of the sleeve that, after a head has been formed at the inner end of the sleeve, the outer end of the sleeve and a protruding end of the screw may be cut off flush with the outer surface of a plate and thus prevent the screw from being tampered with.

Another object of the invention is to provide a rivet of this type which consists of a minimum number of parts, can be easily and quickly passed through registering openings in plates to be secured, and then easily and quickly headed entirely from its outer end and cut off to eliminate protruding portions externally of the wing of an airplane.

Figure 1:
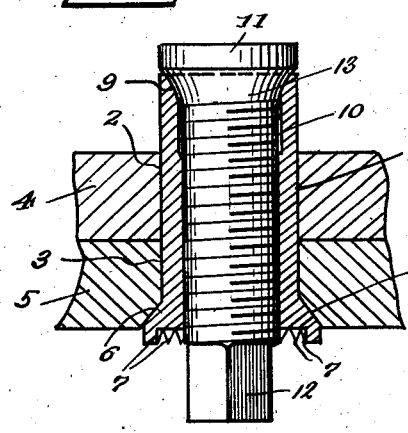
Fig. 1 is a sectional view showing the improved rivet passed through plates to be secured together.
Figure 2:
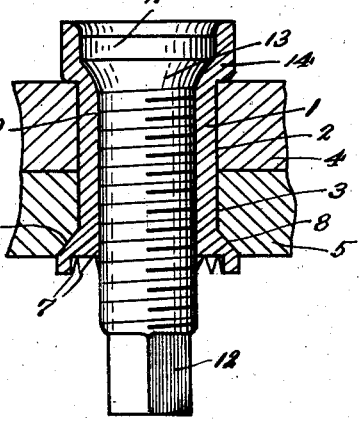
Fig. 2 is a view similar to Fig. 1, showing the rivet formed with a head at its inner end.
Figure 3:
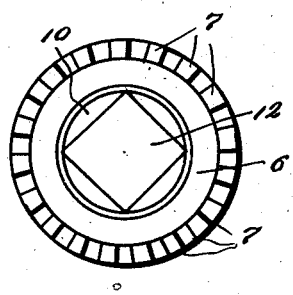
Fig. 3 is a view looking at the outer end of the rivet.
Figure 4:
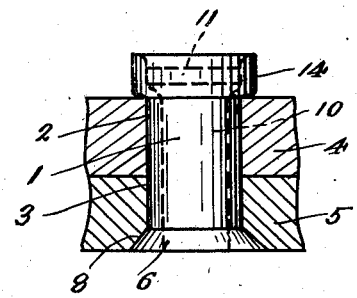
Fig. 4 is a view showing the plates in section and the rivet in elevation with its outer end cut off flush with the plate.

This improved rivet has a tubular body or sleeve 1 formed of metal which is strong but capable of being expanded without likelihood of splitting. The sleeve is of such length that it may be passed through registering openings 2 and 3 formed in plates 4 and 5 to be secured against each other and have its inner or rear end portion protrude from the inner plate 4, as shown in Fig. 1. The outer end of the sleeve is formed with a frusto-conical head 6 having outstanding annular flange serrated to form teeth 7 about its periphery, and these teeth protrude from the outer surface of plate 5 when the head 6 is countersunk within the inwardly tapered seat 8 formed by enlarging the outer end portion of the opening 3 of plate 5. The sleeve or tubular body is internally threaded for the major portion of its length, from its outer front end, and the inner end portion of the sleeve is of reduced wall-thickness, as shown in Fig. 1, and internally reamed to form the inner unthreaded end portion of the bore of the sleeve with a flared mouth 9.

In order to reinforce the sleeve and form a substantially solid rivet when the plates are clamped against each other, and also provide an expander for the inner end portion of the sleeve, there has been provided a screw 10 formed with a spreading head 11 at its inner end and at its outer front end squared to form a wrench-engaging shank 12. A frusto-conical neck 13 is formed about the front end of the head 11 and conforms substantially to the taper of the flared mouth 9 of the bore of the sleeve. Therefore, the neck may fit snugly within the mouth 9 and since the head 11 is of a diameter corresponding to the diameter of the sleeve, the rivet may be freely passed inwardly through the registering openings of the two plates 4 and 5.

After the rivet has been passed through the registering openings and the head 6 at the outer end of the sleeve seated in the tapered seat 8, a wrench is applied to the squared shank of the screw and the screw turned in a direction to advance it forwardly or outwardly through the sleeve. The wrench employed will have a clutch associated therewith for engaging the teeth 7 and holding the sleeve against turning with the screw, as the screw is turned to advance it through the sleeve. The enlarged and unthreaded portion of the bore of the sleeve ends substantially even with the rear surface of the inner plate 4 and, as the screw is advanced, the head 11 and its neck 13 will be drawn into the rear end of the sleeve and expand the inner end portion of the sleeve to form a head 14 at the inner end of the sleeve. This head has flat contacting engagement with the exposed surface of plate 4 about the opening 2 and the two plates be firmly clamped against each other by action of the heads 6 and 14. After the screw has been tightened as much as possible, the teeth 7 and the protruding forward or outer portion of the screw are cut off flush with the outer surface of plate 5 and all portions of the rivet which previously projected from plate 5 will be eliminated. This provides an airplane wing or the like with an unobstructed outer surface as well as eliminating the squared shank 12 and preventing the screw from being tampered with or accidentally turned.

Having thus described the invention, what is claimed is:

1. A rivet comprising a tubular sleeve having its front end portion formed with a radially projecting frusto-conical head, said head having an outstanding marginal flange serrated to form teeth whereby the sleeve may be held against turning in an opening formed through plates to be secured, the bore of said sleeve being threaded from its front end for a major portion of its length and the rear portion of the sleeve having its wall internally reduced in thickness and internally beveled at its extremity to provide the bore with a flared mouth at its rear end, and a screw threaded through the bore of said sleeve and having a head at its rear end corresponding in diameter to the external diameter of the sleeve, the head of said screw having a forwardly tapered frusto-conical neck for fitting snugly in the mouth of said sleeve, and said screw having a wrench engaging head at its front end whereby the screw may be advanced forwardly through said sleeve with its head expanding the rear end portion of the sleeve to form a head for cooperating with the head at the front end of the sleeve to clamp plates firmly against each other between the heads.

2. A rivet comprising a tubular sleeve for passing through registering openings in front and rear plates with its rear end portion projecting from the rear plate, said sleeve having a head at its front end countersunk in the front plate about the opening therein and having means for holding the sleeve against turning, said sleeve being internally threaded from its front end, the rear end portion of said sleeve having its annular wall internally reduced in thickness, and a screw threaded through said sleeve in interfitting engagement with the threads thereof, said screw having an expander at its rear end and at its front end having turning means whereby the screw may be advanced forwardly through said sleeve with its expander moving into the rear end of the sleeve and expanding the same to form a head cooperating with the head of the sleeve to clamp the plates between them.

3. A rivet comprising a tubular sleeve for passing through registering openings in plates to be secured, a head at the front end of said sleeve, the rear end portion of said sleeve projecting from the rear plate and having its wall internally reduced in thickness, the wall of the sleeve between its front end and its reduced rear portion being internally threaded, a screw threaded through said sleeve in interfitting engagement with the threads thereof and having an expander head at its rear end and turning means at its front end, said screw being advanced forwardly through said sleeve when turned with its head moving into and expanding the protruding rear end portion of the sleeve to form a head engaging the rear plate and cooperating with the head at the front end of the sleeve to clamp the plates firmly against each other.

RICHARD E. NELSON.